United States Patent

[11] 3,545,622

| [72] | Inventors | Alexander A. Sakhnovsky;<br>Walter O. Walker, Miami, Florida; Ralph<br>B. Tilney, Clayton, Missouri |
|---|---|---|
| [21] | Appl. No. | 656,346 |
| [22] | Filed | July 27, 1967<br>Continuation-in-part of Ser. No. 25,868,<br>May 2, 1960, abandoned, which is a<br>continuation-in-part of Ser. No. 611,775,<br>Jan. 25, 1967, abandoned |
| [45] | Patented | Dec. 8, 1970 |
| [73] | Assignee | Alco Controls Corporation<br>Creve Coeur, Missouri<br>a corporation of Missouri |

[54] PERMEABLE FILTER AND DRIER BLOCK
3 Claims, No Drawings

[52] U.S. Cl. ..................................... 210/496,
210/502, 210/504; 252/194, 252/455; 55/387

[51] Int. Cl. ......................................... B01d 27/04,
39/20, B01d 53/26

[50] Field of Search............................................ 55/387,
389, 75; 210/502, 504, 506,
496; 252/194, 430, 455

[56] References Cited
UNITED STATES PATENTS

| 2,409,494 | 10/1946 | Keating .................. | 252/430 |
| 2,583,812 | 1/1952 | Briggs et al. ................. | 210/445 |
| 2,781,912 | 2/1957 | Newcum ...................... | 210/295 |
| 2,819,491 | 1/1958 | Gammill et al. .............. | 252/194X |
| 2,873,856 | 2/1959 | Jones............................ | 210/291 |
| 2,933,455 | 4/1960 | Doying......................... | 210/502 |
| 3,025,233 | 3/1962 | Figert........................... | 210/502 |
| 3,044,254 | 7/1962 | Adelman...................... | 252/194X |
| 3,091,550 | 5/1963 | Doying......................... | 252/430X |
| 3,235,089 | 2/1966 | Burroughs.................... | 210/510 |

*Primary Examiner*—Samih N. Zaharna
*Attorney*—Kingsland, Rogers, Ezell, Eilers & Robbins ABSTRACT: The present invention comprises a permeable filter and drier block comprised of silica gel and other inorganic desiccants, such as sodium aluminum silicate, bound together into a self-supporting block, not subject to decrepitation, by an organic plastic binder, such as an epoxy resin, a silicone, or polyvinyl alcohol resin. The block does not char at temperatures of 300° to 450° F. and can be reactivated at high temperatures and is temperature stable. The block can be compacted at relatively low pressures, such as 200 pounds. In the preferred embodiment, larger sodium aluminum silicate particles, which are difficult to bind, are mechanically trapped in the organic resin-bonded silica gel mass. The composition of this invention finds an important use in the drying of various fluids and the removal of water therefrom and in filtering out solid contaminants. It is especially useful as a drier in refrigeration systems.

PERMEABLE FILTER AND DRIER BLOCK

CROSS REFERENCE TO RELATED APPLICATIONS

This application in a continuation-in-part of our copending application Ser. No. 25,868, filed May 2, 1960, now abandoned and of application Ser. No. 611,775, filed Jan. 25, 1967, now abandoned.

BACKGROUND OF THE INVENTION

Previously, desiccants have generally been used in loose form. When so used, and subjected to pressure by fluid passing through them, they are damaged by attrition and movement causing channeling and breakdown of the particles with an attendant loss in drying and filtration efficiency.

The present combined filter and drying block is of primary use in piping of refrigeration circuits to filter foreign matter and to adsorb moisture from the refrigerant. Prior art known to applicant includes U.S. Pat. Nos. 2,819,491 to Gammill; 2,933,455 to Doying; 2,635,991 to Briggs. Additional prior art has been cited in the parent application Ser. No. 25,868. Other prior art comprises loose finely divided materials inserted into the refrigeration line to adsorb moisture from the refrigerant.

SUMMARY OF THE INVENTION

In preferred form, the invention consists of a filter and dryer block made of silica gel particles bonded together by an epoxy binder into a cake, that contains mechanically trapping sodium aluminum silicate particles into the block, the last being difficult to bond by binder alone but being securely held with the mechanical trapping herein explained. It has also been found that by using an epoxy binder, the silica gel particles can be bonded into a cake, so that in a second sense, the present invention comprises a silica gel filter and dryer block. However, it is particularly desirable to combine the exceptional water adsorptive properties of the sodium aluminum silicate into a block that also has the superior filtering properties of silica gel.

The preferred epoxy resin binder minimizes the plugging of the pores of the particles and the interstices of the block that is caused by some other binders and permits reactivation at satisfactory reactivating temperatures. Preferably the epoxy is cured with 4,4' methylenedianiline.

The objects of the invention include those included in the above. Basically the primary object is to obtain a satisfactory silica gel filter block that is also an effective desiccant and that can be used in refrigeration systems. Another object is a filter block made with a plastic binder, especially one employing silica gel, and more particularly, one made of silica gel and sodium aluminum silicate. Other objects are to provide a block composition requiring a reduced quantity of binder and thereby an increased effective drying and filtering area.

It is a particular object of the invention to provide a composition that does not require an inorganic binder, that must be used in such quantity as to reduce the available quantity as well as effective area of the active materials. In other words, blocks bound with inorganic binders generally require undesirably large quantities of inert materials in their composition. Also they have other disadvantages, so it is an object to provide a block that is more uniformly porous and permeable than prior blocks, such, for example, as a ceramic type of block.

Another object is to provide a physically strong block wherein the components do not chip away or crumble or substantially change shape prior to, or during, use or reactivation, regardless of conditions of moisture, temperature or chemical composition of its environment. An object is to provide a block that can be reactivated at temperatures nearer the ideal reactivation temperatures for the desiccants used, than have heretofore been possible with filters formed with plastic-type binders and yet not so high as the reactivation temperatures required with customary inorganic binders. A further object is to provide a block that is temperature stable and does not char at temperatures of 300 to 450° F., thus overcoming a problem that has interfered with the successful use of blocks heretofore suggested, including prior blocks proposing the use of plastic resinous binders. In this connection, it is an object to provide a block that is dimensionally, physically, and chemically stable under the conditions of temperature, pressure and chemistry existing in the usual refrigeration system, including having the filter block held in place under spring force. It is a particular object to provide a block that is not injured by the materials in conventional refrigeration systems, and particularly familiar refrigerant materials such as ammonia, carbon dioxide, Freon (R12 or R22), etc. It is another object to provide a filter block that does not have excessive resistance to fluid flow through it, i.e., that is permeable and that does not cause a pressure drop in the fluid greater than a small amount.

Another object is to provide, as far as possible, a composition that does not adsorb the binder without the necessity of pretreatment during the manufacture of the block.

Another object is to provide a block that can be compacted at relatively low pressures, such as 200 p.s.i., for instance, since pressures required for compaction with certain previously identified compositions and binders are so high that they would crush blocks employing the materials that have the desired drying and filtering properties of the present ones. In this connection, the 1,000 to 1,200 p.s.i. required for compaction of the block employing certain components heretofore proposed to be bonded by cellulose acetate, would seriously reduce the effectiveness of the present block with its very desirable filtering and desiccant qualities.

While there is a distinct advantage to the use of the combination of silica gel and sodium aluminum silicate bonded as aforesaid, certain alternative compositions may be used to obtain some of the foregoing objectives.

DETAILED DESCRIPTION OF THE INVENTION

The preferred form of the invention comprising a block made of silica gel, sodium aluminum silicate, and an epoxy resin binder, can be as follows wherein each component is set forth, followed by a size range where appropriate, a preferred specific quantity and finally a range in percentages. The first two percentages are related to each other, by weight, and the third percentage is related to the silica gel by weight.

Silica gel, 6–60 mesh—232 gr. (App. 95–75%).
Sodium aluminum silicate, ⅛″–30 mesh—11 gr. (App. 5–25%).
Epoxy resin binder—7.7 gr. (1–18% of silica gel).

A suitable sodium aluminum silicate is Molecular Sieve MS4A sold by Linde Company. A suitable binder is Epon 828 sold by Shell Chemical Company. It is a liquid at room temperature, and has a viscosity of 100—160 p. at 25° C., and an epoxide equivalent of 175–210. Epon 815 and 820 may also be used. These epoxy resins have a chemical structure shown in the following typical molecular formula and typically differ among themselves in molecular weight, the molecular weight increasing as $n$ increases:

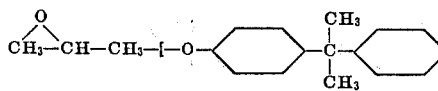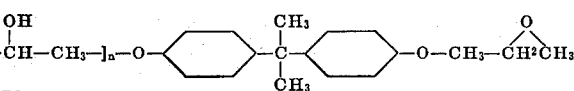

Epoxy resins are reaction products of epichlorohydrin and 2,2 bis (4 hydroxyphenyl) propane. The epoxide equivalent is the number of grams of resin to completely esterify 1 gram mol of monobasic acid. The preferred curing agent for use with the epoxy resin is 4,4' methylenedianiline (MDA). This curing agent needs to be one that will not be adsorbed by the desiccants before it can react with the epoxide. If it does adsorb to a high degree, an undesirably large amount of binder must be used. As noted herein, the named curing agent admits of use of a low percentage of binder.

Where ease in handling and pot-life are important considerations, it is preferable to dissolve the 4,4′ methylenedianiline in acetone to give a solution containing 40 to 60 percent of the former. The MDA preferably should be from 26.8-–31.1 percent by weight of the resin. An amount of epoxide resin should be added to this MDA solution to give 28.5 grams of 4,4′ methylenedianiline per 100 grams of resin. The amount of acetone should be kept at a minimum for economic as well as safety reasons. The maximum of 60 percent 4,4′ methylenedianiline in acetone approaches the practicable solubility limit.

As an example of the process of manufacturing the block, there is shown below in example I a method of manufacture:

EXAMPLE I

Silica gel in the amount of 232 grams, 20—40 mesh, is mixed with 7.7 grams of binder made as described above. To 187 grams of this mixture is added 23 grams of sodium aluminum silicate spheres, 4—8 mesh. The mixture is tamped to 200 p.s.i. The block is cured at about 420° F., then activated for 3 hours at about 375° F., heated air being passed through as a purge gas. The final block has about 2.5 percent binder.

It is desirable to surround the foregoing block with a layer of the originally mixed silica gel and binder, which can be done by tamping a first layer of the same into the mold, followed by a layer of the entire mix, and finally by a layer of the silica gel and binder, prior to curing. This laminating is especially desirable where the silicate particles are large, and might become dislodged in handling or use.

It appears that the binder has greater adhesive effect on the silica gel particles, and that the silicate particles, which are larger and smoother, are less subject to the binder, and are primarily held by being mechanically trapped in the bonded silica gel mass. By this combination a strong filter-desiccant block, of both silica gel and sodium aluminum silicate, is attained.

In general, if larger particles of silica gel are used, more binder is required.

The proportions of the components may be varied and modified somewhat as will be appreciated by those skilled in the art. Example II below illustrates such a modification.

EXAMPLE II

In this example an epoxy binder made as previously described is employed with molecular sieve and silica gel. The molecular sieve is used in the amount of 20 percent of the total desiccant while silica gel is used in the amount of 80 percent. The epoxy binder is employed in a sufficient amount to provide 3 percent total solids after curing. In the process 161 grams of silica gel are thoroughly mixed with the epoxy resin binder previously described.

Subsequently the molecular sieve is added. It is to be noted that if it is added earlier, it tends to adsorb the epoxy resin and this should be avoided. After this last addition the resultant composition to surround the molecular sieve particles by coated silica gel, which locks the former particles in a lattice type of structure when the composition is finally cured, is mixed. The composition is then molded and impacted in a jolter at 90 p.s.i. to provide a uniform density. While still in the mold the composition is baked in an oven at 325° F. for a period of 2½ to 3 hours. The resultant block is then transferred to a cylinder and painted and baked for a final period of about 4 hours at 390° F. to cure the paint and fully activate the filter and drier block. In the baking stages the block is purged with heated air and a vacuum is applied at 29 inches of mercury as an example. No moisture is required for activation.

Also the filter and drier block may be desirably made using a single desiccant. Thus, the epoxy binder may be employed with silica gel to provide a strong filter and drier block that has very desirable characteristics. In the process of making the block, it will be noted that no pretreatment of the desiccant is required since the epoxy binder is not undesirably adsorbed in the desiccant pores. The following is an example of such a block.

EXAMPLE III

One-hundred grams of silica gel in the dry or activated state having a particle size within the range of 20—40 mesh intimately mixed with 2.5 grams of liquid epoxy organic binder solution. The epoxy binder is made in the same manner as described above. The slightly tacky mixture is tamped in a suitable mold in 0.5-inch thick layers at approximately 200 p.s.i. The resin is then cured for 1 hour at 425° F. The molded block of the silica gel and cured epoxy resin is then activated by heating the assembly for 4 hours at 375° F., with a gentle stream of purge air or other gas being forced through the block.

By means of this invention as described, blocks may be prepared at moderate pressures, e.g. 200 p.s.i. as noted above. Also, by the use of a suitable organic binder, such as the epoxy resin, substantial heating and curing temperatures can be used, which greatly simplifies the process of preparing the blocks. These temperatures can be as high as in the order of 400° F., and above, without charring, as a result of which the curing and drying time and pressure may be kept to a minimum.

While the foregoing block using the silica gel and sodium aluminum silicate in combination represents what is believed to be a distinct and outstanding filter block composition, it is also believed that for the first time a successful silica gel filter block employing the epoxy resin has been achieved. That is, a filter block, the filtering and desiccant component of which consists essentially of silica gel, has been produced. In view of the great advantage of silica gel for these purposes, it is believed that this aspect of the invention is also of great importance, even without certain of the qualities obtainable only in the preferred form of the invention previously described.

The use of the epoxy resin binder in the combination desiccant employing the silica gel and molecular sieve is an advantage as the epoxy resin is not adsorbed in this composition. Thus, by the employment of the epoxy resin in the preliminary mixture with the silica gel adsorption by the sodium aluminum silicate is prevented. Sodium aluminum silicate is a very active adsorbent and by means of this process undesirable adsorption has been prevented.

It will be apparent that other organic resins may also be employed besides the epoxy resin, however. Thus, the desirable features of this invention using the silica gel and molecular sieve in combination may be achieved by using other organic resin binders than the epoxy resin. However, the epoxy resin binder is preferred because of its ease in the manufacture of the blocks and because of its very desirable advantages in the filter and drier block to provide a strong, durable, stable structure that resists attack by refrigerants and other chemicals. Other resins may be employed, as mentioned above, however, in the preparation of the combination silica gel and sodium aluminum silicate filter and drier block. Thus, the broad feature of the invention is to provide a combination filter and drier block using silica gel and sodium aluminum silicate and also one in which the sodium aluminum silicate particles are trapped in place in a lattice type of structure.

Other resins that can be employed are conventional organic resins that are not appreciably adsorbed, or in which a silica gel containing an appreciable amount of water to prevent the blocking of the pores is employed.

As an example of another binder that can be used besides the epoxy resin, an organopolysiloxane resin, commonly known as a silicone resin, can be employed. Such a silicone resin, which is a thermosetting resin, is shown in example IV below.

EXAMPLE IV

In this example a silicone thermosetting resin was employed having 60 percent solids dissolved in toluene. This resin was mixed in the amount of 1.9 grams with 95.2 grams of silica gel of 20—40 mesh size and containing 27 percent water. To this mixture was added 4½ grams of molecular sieve as a dry powder. The entire mixture was then mixed thoroughly to a rather dry form with no tack. The mixture was then heated for 4 hours at 425° F. Subsequently, 4½ grams of the silicone resin was mixed in and some loose powder was sifted to the bottom. This provided a rather dry mixture which was tamped at 200 p.s.i. This composition was then heated for 4 hours at 425° F. The product showed a normal shrinkage and formed a block which was essentially undiscolored with fair strength and porosity. The total binder of the silicone was in the amount of about 9.2 percent.

The particular silicone resin mentioned is a solution containing 40 weight-percent toluene and 60 weight-percent of a silicone resin formed by the cohydrolysis and cocondensation of dimethyldichlorosilane, methyltrichlorosilane and phenyltrichlorosilane in a weight ratio of 1.0:1.06:1.37. The hydrocarbon group to silicon atom ratio in the resin is 1.29:1. The resin polymer chain is composed of siloxane linkages

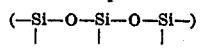

and the resin has the following groups: $(CH_3)_2SiO$, $CH_3SiO_{1.5}$ and $C_6H_5SiO_{1.5}$.

An alternative method of preparing a silicone block using the combination silica gel and molecular sieve desiccant is shown in example V below.

EXAMPLE V

In this example 7 grams of molecular sieve as a dry powder was mixed with 5 grams of silicone resin as in the immediately preceding example together with 1 gram of toluene. The mixture was then thoroughly mixed to provide a thick paste. Subsequently in a separate step 80 grams of silica gel of 20—40 mesh and 28 percent water was mixed with 3.8 grams of the silicone resin and thoroughly mixed. Then the two molecular sieve and silica gel binder compositions were added to one another and mixed. The composition was then tamped at 150 p.s.i. and heated for 4½ hours at 425° F. The product showed considerable shrinkage but acceptable strength and porosity. The total binder solids employed was in the amount of 7.7 percent of the resultant product.

As a further example, polyvinyl alcohol can be employed with the combination silica gel and molecular sieve desiccant. Such an example is shown below in example VI.

EXAMPLE VI

In this example polyvinyl alcohol containing 15 percent solids and having a low viscosity was mixed in the amount of 5 grams with 3½ grams of molecular sieve powder containing 20 percent water. To this composition was added 33 grams of silica gel containing 25 percent water and being of 20—40 mesh size. This composition corresponded to 2.7 percent binder and 10 percent molecular sieve. The composition was then hand tamped and heated for 4 hours at 350° F. The resultant block had a pale tan color, was strong and showed considerable shrinkage with fair porosity. This block was considered to be a good product with a binder content which was rather low for the strength obtained.

EXAMPLE VII

In this example, 60 grams of silica gel, 20—40 mesh, and 3.05 percent of the epoxy binder previously mentioned were mixed with 12 grams dry sodium aluminum silicate, 14—30 mesh, and tamped at 250 p.s.i. It was reactivated at 350° F. About 16.7 percent by weight of the block was sodium aluminum silicate. This block was acceptably strong.

In variants of example VII, 8—20 mesh silica gel was used. This gave lower pressure drop as a filter, and although less strong mechanically, was satisfactory. In another variant, using 8—20 mesh silica gel dry, plus 2.5 percent of the epoxy—MDA—acetone binder, and 20 percent by weight of one-sixteenth of an inch of dry sodium aluminum silicate, tamped at 25 p.s.i.g., cured 1 hour at 425° F., a usable block was made, though not as good as the preferred form.

EXAMPLE VIII

In this example an epoxy resin was employed that was a Shell Epon 828 as before. It was employed with molecular sieve and silica gel. The molecular sieve was used in the amount of 22 grams in the form of 4—12 mesh beads, preferably in the 8—12 mesh range. Eighty grams of silica gel was employed of a 20—40 mesh size. The epoxy binder consisted of 2.33 grams of the Epon 828 resin mixed with two-thirds gram MDA which had been previously diluted with 1 gram acetone.

The drying ability of the blocks made with the various inorganic desiccants and an organic binder combination, as set forth above, has been evaluated over different temperature ranges with different types of organic refrigerants. Tests have demonstrated the satisfactory operation and pickup of water in such refrigerants and have also demonstrated the desirable filtration aspects of these blocks.

It may be noted that, while the epoxy resin binder is the preferred plastic for reasons expressed most especially in connection with the combination silica gel and sodium aluminum silicate form of the invention, some of the advantages of the invention in its several forms may be obtained by using other plastic binders.

Accordingly, various changes and modifications may be made in this invention, as will be apparent to those skilled in the art. Such changes and modifications are within the scope and teaching of this invention as defined by the claims appended hereto.

We claim:

1. A filter and drier block, consisting essentially of silica gel, 6—60 mesh, approximately 95—75 percent; sodium aluminum silicate ⅛ inch—30 mesh, approximately 5—25 percent; together with an organic resin binder in amount less than 10 percent of the weight of the silica gel and sodium aluminum silicate, the binder adhering to the silica gel, and with it forming a matrix that embraces and applies a mechanical holding force to the sodium aluminum silicate to secure the same in the block, the organic binder is from the group consisting of epoxide resin, and silicone thermosetting resin.

2. The block of claim 1, wherein the binder comprises an epoxy resin cured with a curing agent of 4.4 MDA dissolved in acetone, providing a solution containing 40—60 percent MDA, the binder being such that the curing agent is not adsorbed by the desiccant before it reacts with the epoxide.

3. A combined filter and drying block, the block consisting essentially of particles of silica gel, about 6—60 mesh, approximately 95—75 percent; sodium aluminum silicate, about ⅛ inch—30 mesh, approximately 5—25 percent; and an organic plastic binder consisting of epoxy resin, the binder being adhered to the silica gel, the particles being thereby bonded into contiguous relationship but providing a permeable block, and the sodium aluminum silicate particles being distributed through the silica gel and being mechanically entrapped into the block by the bonded silica gel particles, the binder being in amount of about 1—10 percent by weight of the silica gel and sodium aluminum silicate, and being distributed throughout the mass, the block being permeable as aforesaid, to permit passage of refrigerant therethrough without excessive pressure drop, and the particles being porous to adsorb moisture from the refrigerant.